United States Patent [19]

Mohan et al.

[11] Patent Number: 5,276,835
[45] Date of Patent: Jan. 4, 1994

[54] NON-BLOCKING SERIALIZATION FOR CACHING DATA IN A SHARED CACHE

[75] Inventors: Chandrasekaran Mohan, San Jose; Inderpal S. Narang, Saratoga, both of Calif.

[73] Assignee: International Business Machines Corporation, Armonk, N.Y.

[21] Appl. No.: 628,211

[22] Filed: Dec. 14, 1990

[51] Int. Cl.$^5$ .............................................. G06F 13/00
[52] U.S. Cl. ............................. 395/425; 364/DIG. 1; 395/600
[58] Field of Search ................ 395/425, 600, 550, 650

[56] References Cited

U.S. PATENT DOCUMENTS

| | | | |
|---|---|---|---|
| 4,080,651 | 2/1977 | Cronshaw et al. | 395/425 |
| 4,126,894 | 11/1978 | Cronshaw et al. | 395/425 |
| 4,399,504 | 8/1983 | Obermarck et al. | 395/650 |
| 4,551,799 | 11/1985 | Ryan et al. | 395/425 |
| 4,663,709 | 5/1987 | Fujiwara et al. | 395/725 |
| 4,809,168 | 2/1989 | Hennessy et al. | 395/650 |
| 4,843,542 | 6/1989 | Dashiell et al. | 395/425 |
| 4,888,681 | 12/1989 | Barnes et al. | 395/600 |
| 4,891,749 | 1/1990 | Hoffman et al. | 395/425 |
| 4,920,485 | 4/1990 | Vahidsata | 395/725 |
| 4,928,225 | 5/1990 | McCarthy et al. | 395/425 |
| 5,075,846 | 12/1991 | Reininger et al. | 395/425 |
| 5,119,485 | 6/1992 | Ledbetter, Jr. et al. | 395/425 |

FOREIGN PATENT DOCUMENTS

| | | |
|---|---|---|
| 0329942 | 1/1989 | European Pat. Off. |
| 64-78361 | 6/1988 | Japan |
| 2-67670 | 9/1988 | Japan |
| 2-77943 | 9/1988 | Japan |
| 2-77868 | 3/1990 | Japan |

OTHER PUBLICATIONS

A. J. van de Goor, Computer Architecture and Design, Addison-Wesley Pub. Co., 1989, pp. 492–507.
C. J. Date, An Introduction to Database Systems, 1986, vol. I, Fourth Edition, Addison Wesley Pub. Co., pp. 593–595.
Harvey, M. Deitel, An Introduction to Operating Systems, Second Edition Addison Wesley Pub. Co., 1990, pp. 187–190.
V. Bohn, "Extended Memory Support for High Performance Transaction Systems", University Kaiserslautern, Technical Report, Aug. 1990, pp. 1–21.

*Primary Examiner*—Glenn Gossage
*Attorney, Agent, or Firm*—Baker, Maxham, Jester & Meador

[57] ABSTRACT

A method of controlling entry of a block of data is used with a high-speed cache which is shared by a plurality of independently-operating computer systems in a multi-system data sharing complex. Each computer system has access both to the high-speed cache and to lower-speed, upper-level storage for obtaining and storing data. Management logic in the high-speed cache assures that the block of data entered into the cache will not be overwritten by an earlier version of the block of data obtained from the upper-level storage.

9 Claims, 5 Drawing Sheets

NON-BLOCKING SERIALIZATION FOR CACHING DATA IN A SHARED CACHE

CROSS REFERENCE TO RELATED APPLICATION

This application is related to corresponding U.S. patent application Ser. No. 07/627,315, filed Dec. 14, 1990, for "NON-BLOCKING SERIALIZATION FOR REMOVING DATA FROM A SHARED CACHE", the inventors being C. MOHAN ET AL, and the assignee being the assignee of this application.

The following, co-pending patent applications, all assigned to the Assignee of this application, also contain material related to the material in this application:

U.S. patent application Ser. No. 07/493,581, filed Mar. 14, 1990, now U.S. Pat. No. 5,226,143; and U.S. patent application Ser. No. 07/548,516, filed Jul. 2, 1990.

BACKGROUND OF THE INVENTION

The invention concerns caching data in a cache serving a multi-system data sharing complex. In particular, the invention concerns the caching of a data page by one database system into the shared cache in view of the possibility that another system could be trying to cache a later copy of the same page. This invention concerns the technique to detect such a condition and to bar entry of the non-updated page into the shared cache.

In a database system wherein a plurality of independently-operating computer systems share data, global locking is required to maintain coherency of data in the different systems. A. J. van de Goor, in COMPUTER ARCHITECTURE AND DESIGN, Addison Wesley, 1989, discusses the data coherency problem as one in which sharing data among a proliferation of processors raises the possibility that multiple, inconsistent copies of data may exist because of multiple paths to the data and because of opportunities to locally modify the data.

Solutions to the data coherency problem have been proposed. All are based essentially on the existence of a global lock on data retrieved from a central location. Assuming pagination of data, one computer system of a multi-computer system which shares data stored on a disk acquires a global lock on a page of data and obtains and updates the page. The lock signifies to the other computer systems that the page has been acquired for updating. Prior to releasing the lock on the page, the computer system holding the lock writes the page to the disk, after which it generates and sends a message to the other computer systems to invalidate any copies of the page which may be held in their local cache. The lock on the page is not released until acknowledgement is received from every other computer system having access to the page. This solution is described in detail in U.S. Pat. No. 4,399,504, which is assigned to the assignee of this patent application, and which is incorporated herein by reference. A commercial product available from the assignee of this application and which incorporates this solution is the IMS/VS (information management system/virtual storage) system with the data sharing feature.

The prior art global locking system provides great advantage in maintaining data coherency. However, the overhead penalties inherent in it include the requirement for performing an I/O (input/output) procedure when a page is updated and undertaking message exchange after the I/O procedure in order to notify the other systems and release the lock.

When used in a non-data-shared single system case, the prior art IBM (International Business Machines) IMS/VS product still incurs extra overhead in maintaining data coherency (consistency) between transactions by implementing a commit policy requiring each transaction which updates data to write the modified data, together with log records, to storage before the transaction is fully committed. This requires one I/O procedure per page for each modifying transaction, which increases overhead costs.

In contrast, the IBM DB2 in the single system, non-data-sharing case follows a policy which does not require an I/O process to write an updated page back to storage in order to commit a transaction. If the protocol described above is used in the IBM DB2 product in a data-sharing situation where a plurality of computer systems access one or more data storage sites, the performance could degrade significantly because of the required write back to storage and message delay. In this regard, see C. J. Date's discussion of concurrency at pages 593-595 in Vol. I of AN INTRODUCTION TO DATABASE SYSTEMS, Addison-Wessley, 1986.

In a multi-computer, data-sharing system which includes multiple levels of storage, it is contemplated that a first level of storage would consist of one or more direct access storage devices (DASD's) which are shared by independently-operating computer systems. Typical nomenclature for hierarchally-arranged storage systems classify DASD and other such storage facilities as "secondary" storage. In this regard, secondary storage includes all facilities from which data must be moved to "primary" storage before it can be directly referenced by a central processing unit (CPU). See Detiel, OPERATING SYSTEMS, Second Edition, 1990, by Addison Wesley, page 30. It is further contemplated that caching techniques would be useful to provide a high-speed, frequently-accessed storage for shared data. For various reasons, data would be entered into the shared cache by the database systems after acquisition from DASD's. In this regard, a shared cache would be included in a primary level of storage for a multi-computer, data-sharing system.

In such a structure, a potential hazard would exist if one computer system obtained a block of data from DASD for the purpose of caching it after the same block of data had been obtained, modified by another computer system and cached, but not yet returned to DASD. In this situation, the outdated block obtained from DASD is referred to as a "down-level" version of the updated block in cache. The challenge is to prevent the overwriting of the updated block by the down-level version without incurring the expense of locking the DASD version.

Typically, global locking protocols are used by a database system to serialize access to the record of interest in the data sharing case. The inventors contemplate that they would still be used. Also typically, there would be global locking on the page to serialize updates to the page from different database systems. The avoidance of serialization described in this invention is for inserting a down level page from the secondary storage into the shared cache by different database systems.

SUMMARY OF THE INVENTION

The primary object of this invention is to provide a method and structure in a shared data, multi-computer system which guarantees that any page of data in a shared cache will not be overwritten by an earlier version of that page obtained from any other shared data storage resource.

A significant advantage of the invention is that it tolerates the retention of known methods and structures for DASD access, while maintaining the integrity of data obtained from a DASD and cached in a memory shared by a plurality of autonomous computer systems.

An important object of this invention is to provide a method for operating a multi-system, data-sharing complex in which data is cached in a shared electronic memory.

In a multi-system, data-sharing complex, a database system executing on a first computer system could be caching an updated page in a shared cache while another database system could be trying to cache a copy of the same page obtained from a DASD. The invention detects such a condition and, without a serialization mechanism such as locking, bars entry of the copy obtained from the DASD.

The key innovation of this invention is a technique for operating a shared cache in a multi-system data-sharing complex that does not require high-level locking to guarantee consistency when inserting a block of data into the cache. Critical to the invention are a "conditional write" procedure used to insert blocks of data into the cache and a cache directory that begins to track "ownership" of a block of data at the time that a first read request issued against the block of data results in a cache miss. At the time of the first cache miss, a cache directory is updated to include the requested block of data and the requesting computer system is identified as having the current copy of the block. Upon receiving a cache miss indication in response to a read request, the requesting computer system fetches the block of data from DASD for placement into the cache. Placement in the cache of a block of data obtained from the DASD is done by way of the conditional write operation. In the conditional write operation, the cache directory is checked for the computer system holding the page obtained from the DASD and, if that computer system is still recorded in the cache directory as having the current copy of the page, the conditional write operation is accepted and the page inserted into the cache. The ability of a computer system issuing a conditional write request to have the request satisfied can be invalidated only by a write operation from another computer system which places an updated version of the identified block of data into the cache, or by the directory entry having been appropriated and re-used.

DETAILED DESCRIPTION OF THE PREFERRED EMBODIMENT

The invention provides the structure of a multi-system data sharing complex including a shared cache in the form of a non-volatile electronic memory and a method for operating the cache for sharing data resources while maintaining coherency among several, possibly different, versions of the data.

Figure 1:
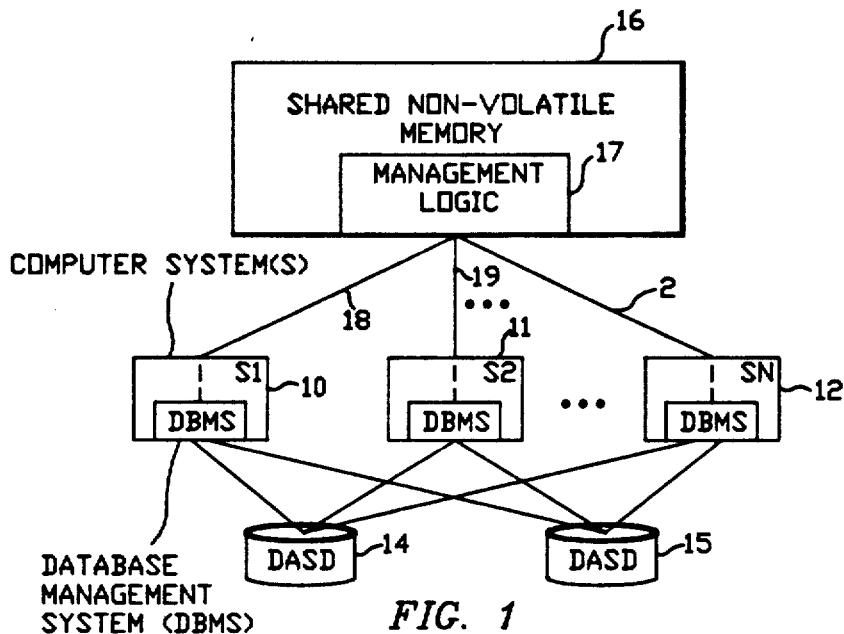
FIG. 1 is a block diagram representation of a multi-system data sharing complex including a high-speed, non-volatile memory used as a shared cache.

If a data coherency policy in a multi-computer, data-sharing system requires writing of an updated page, an architecture with certain significant characteristics can be used. Such an architecture is illustrated in FIG. 1 and includes a plurality of independently-operating computer systems 10, 11, and 12, which share data stored on direct access storage devices (DASD) 14 and 15. The DASD's 14 and 15 can comprise, for example, multi-disk disk drives. The architecture includes N computer systems, S1-SN, each including a database management system (DBMS) which controls creation organization, and modification of a database comprising data on the DASD's 14 and 15 and which controls access to the data in the database. Also provided in the system is a high-speed non-volatile (NV) electronic memory 16 which functions as a cache shared by the computer systems. The memory 16 is attached with high-speed links 18, 19, 2 to the computer systems 10, 11, and 12. Hereinafter, the memory 16 is referred to as either "the memory" or "NV-store".

When comparing access to the memory 16 with access to DASD's 14 and 15, it is asserted that the memory 16 is a relatively high-speed semiconductor memory. Further, the attachment of the memory 16 to the computer systems is by way of, for example, fiber optics communication channels which provide very high speed (hundreds of megabytes per second) data transfer. Relatively speaking, an I/O operation conducted in the relatively high-speed memory 16 might take tens of microseconds, while, as is known, I/O with relatively lower-speed DASD can take tens of milliseconds.

The memory 16 includes management logic 17, preferably in the form of a processor which manages all memory storage operations. The management logic 17 can comprise, for example, a high performance microprocessor with a local program store and private memory, rendering a management logic device capable of engaging in message-based memory access transactions with the computer systems 10, 11, 12.

Respecting the computer systems 10, 11, and 12, these entities can comprise, for example, IBM/3090 Systems, each including a multi-processor architecture with a private cache, and each capable of supporting a database management system of the IMS/VS or DB2 type.

Figure 2:
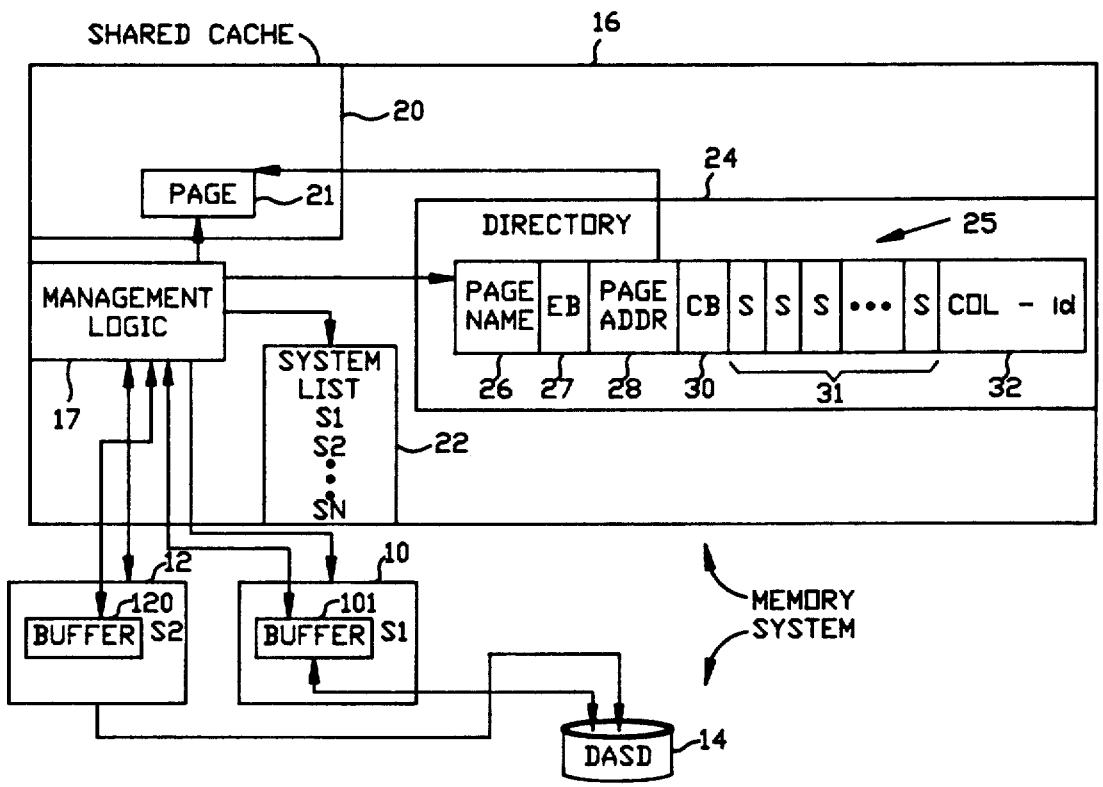
FIG. 2 is a block diagramatic view showing in greater detail the shared memory of FIG. 1 and data structures necessary to practice the invention.

Substantially, the invention is practiced in the data sharing complex illustrated in FIG. 1 and described above. Shown in greater detail in FIG. 2 are structural components required for the practice of the invention. In the memory 16, are found a semiconductor memory designated as a shared cache 20. The shared cache 20 can comprise conventional, multi-port, high-speed, random access memory which is preferably non-volatile. The shared cache 20 is used for storage of blocks of data. For example, the shared cache 20 can be used to store pages of data, where one such page is indicated by 21.

The management logic 17 has private memory resources for storage and maintenance of a system list 22 and a page directory 24. The list and directory 22 and 24 are accessed conventionally by the management logic 17. For example, well-known hashing lookup mechanisms can be used for accessing these data structures. The system list 22 is a data structure containing a plurality of entries each entry identifying a computer system which is connected operationally to the memory 16. Assuming, for example, that the computer systems S1, S2, ..., SN are connected, they will be listed in the system list 22.

The shared cache 20 is operated as a "store-in" cache, as opposed to a "store-through" cache. In this regard, a "store-in" cache is one into which updated pages can be written without the requirement that those pages be written simultaneously into ("stored-through to") secondary storage.

A page cached in the shared cache 20 is identified by a software-assigned name. Therefore, any requests for reading or writing in the shared cache 20 are required to specify the name of the page which is the object of a request. The directory 24 is conventionally indexed by the names of pages which are objects of READ or WRITE commands. A representative entry in the directory 24 is indicated by reference numeral 25. In respect of the invention being described, the fields of the directory 25 which are relevant are shown in FIG. 2. These include a page name field 26, an empty bit (EB) field 27, a page address field 28, a change bit (CB) field 30, and a system-valid-bit vector (SV BIT VECTOR) field 31 including bits S for respective computer systems S1 ... SN.

The page name field 26 is the field by which the management logic 17 indexes into the directory 24. Assume that the management logic 17 receives a READ or WRITE command, either of which would be accompanied by a value for a parameter P identifying the page. Management logic 17 subjects the value for P to a hashing process which generates a value used by the logic to access the directory quickly via the page name, if it already exists. Once the page name field has been located, the page address field 28 is used to point to the address in the shared cache of the identified page. In the practice of the invention, a directory entry is created the first time a read request for the page is received. At this time, the page address field of the directory is left blank until the page is written in a subsequent write operation.

The significance of each of the EB, CB, and SV BIT VECTOR fields is given in Table I.

TABLE I

| | | |
|---|---|---|
| Empty bit | = 1, | data for the page does not exist in the cache (only the directory entry for the page exists) |
| | = 0, | data for the page exists in the cache at the location indicated in the "Page address in the Cache" field |
| Change bit | = 1, | the cached page is changed, i.e., the DASD version of the page is down-level compared to the one in the NV-store |
| | = 0, | the cached page is unchanged, i.e., the DASD version of the page is the same as the one in the NV-store |
| System-Valid-Bit Vector (SVBV) | | One bit per system attached to the cache. If 1, the page cached in the identified system memory is valid. If 0, the page cached in the system's memory is not valid. The size of this bit array is implementation dependent. |

The management logic 17 creates, manages, and deletes directory entries as necessary. These activities are conducted using known mechanisms, although the precise structure of entries in the directory 24 is unique to this invention. The management logic 17 is also conventionally structured to obtain data from, and enter data into, the shared cache 20, although according to read and write operations which are unique to this invention. The management logic 17 also includes the usual cache management capability to generate "cache miss" and "cache hit" signals. These signals are generated in response to READ commands submitted by the computer systems connected to the shared cache 20. A "cache miss" signal indicates that an identified page does not reside in the shared cache 20, while a "cache hit" signal indicates that an identified page is in the cache 20.

READ and WRITE commands are generated by the computer systems in the multi-system complex of FIG. 1. These commands elicit responses from the management logic 17. The inventors contemplate that commands and responses are exchanged between a computer system and the management logic by any well-known message protocol. Further, the inventors contemplate that access to the shared cache 20 is synchronous in that any computer system issuing a READ or WRITE command maintains a wait state until a response is received from the management logic 17. The speed of the semiconductor memory forming the shared cache 20 reduces the delay inherent in a synchronous message passing structure.

The inventors also contemplate that the computer systems of the multi-system data sharing complex in FIG. 1 obtain access to DASD's using conventional means, for example, the shared disk capability of an IBM IMS system. As is known, such access is asynchronous in that a computer system will not enter a wait state while a READ or WRITE command is dispatched to a DASD.

As FIG. 2 illustrates, each computer system includes an identified buffer which is used to stage data exchanged between the computer system and the NV-store 16. For example, the computer system 10 includes a buffer 101, while buffer 120 is provided in the computer system 12. It is asserted that all computer systems of the data sharing complex possess such private buffers. Further, whenever one of the computer systems provides a READ or WRITE command to the management logic 17, it sends an address in its private buffer where the requested data is to be entered or obtained.

The invention concerns the movement of data into the shared cache from DASD, and the updating of data so moved. Relatedly, a data page which is obtained by a computer system from a DASD for entry into the shared cache is referred to in Table I and hereinbelow as a "down-level" page when the directory entry for the page has the change bit set to 1. When the change and empty bits in the directory entry for a page obtained from DASD are set to 0, the page is referred to as a "clean page". In this regard, the DASD version of the page is the same as a version of the page in the shared cache 20.

The invention depends upon a set of unique commands and the registration in affected directory entries of changes resulting from execution of those commands. These commands will be described a first. A description will then be provided as to how these commands support non-blocking serialization to cache a page in the multi-system data sharing complex of FIG. 1, while maintaining the page's data integrity. These commands permit one system to cache an updated page while another system is attempting to cache a non-updated version of the page after a cache miss caused by a read request. In the practice of the invention, a command whose object is a given page is serialized with other commands for the same page by the management logic 17 in the memory 16.

For the purposes of this disclosure, the memory system 16 of FIG. 1 supports the following commands:

a CONNECT command executed by a software system, such as an instance of a database system in the multi-system data sharing complex of FIG. 1, connecting to the NV-store 16. In response to a CONNECT command, the management logic 17 enters the identification of the connecting system into the system list 22 and provides a field for the connecting system in the SV bit vector of every entry currently in the directory 24 and every entry thereafter made;

READ PAGE (S, P, Buffer Address), where S identifies the system issuing the command, P identifies the requested page, and Buffer Address denotes the address in the buffer of the system where the page is to be delivered;

WRITE PAGE (S, P, CB=1, Buffer Address) This command is also referred to as an "unconditional" WRITE. When a WRITE PAGE command is issued, the parameters input with the command include a CB parameter corresponding to the CB field for the identified page. Updating of the page is indicated by setting the change bit to 1; and CONDITIONAL WRITE (S, P, CB=0, Buffer Address)

The CONDITIONAL WRITE command is used to "cast in" or enter into the NV-store a page which the conditionally writing computer system has obtained from secondary storage, and has not changed.

Figure 3:
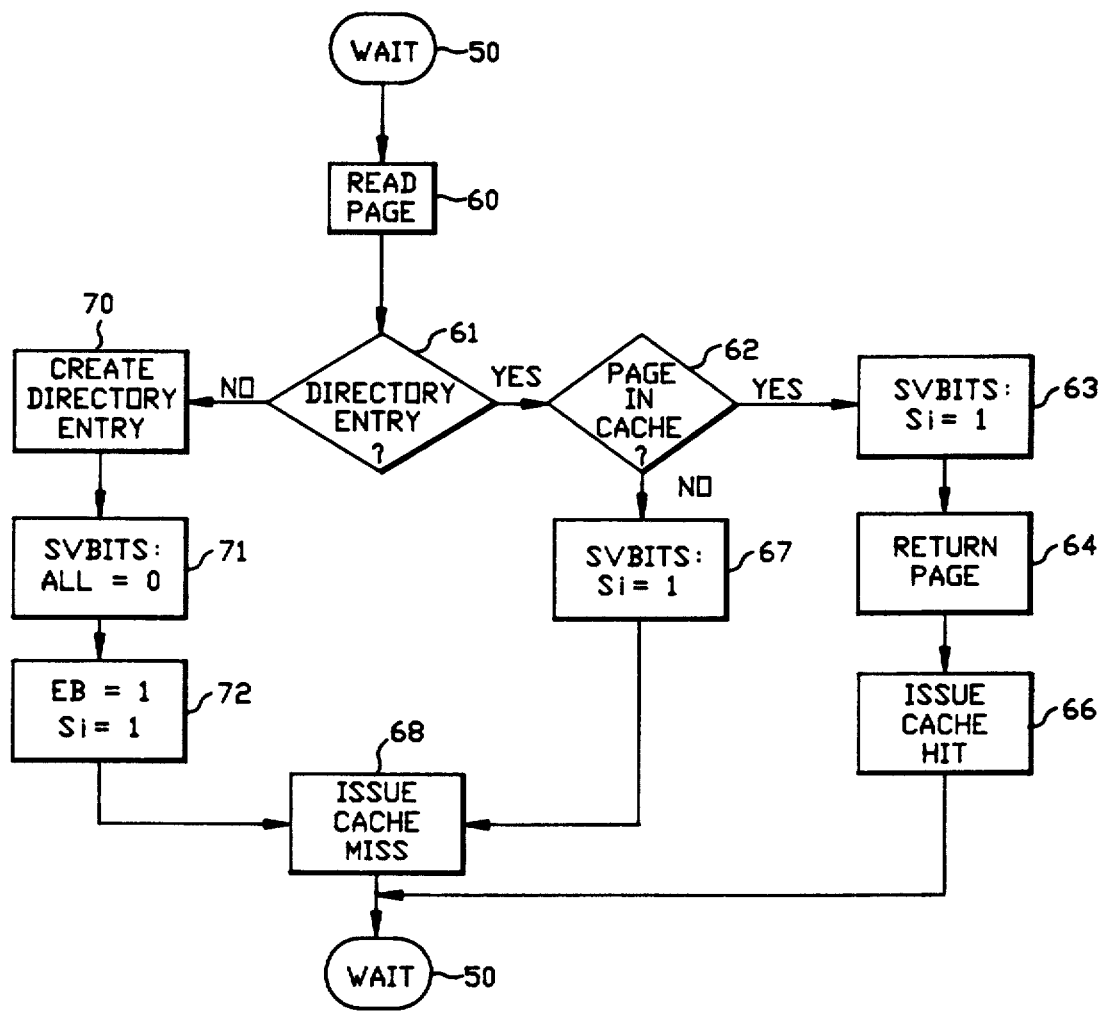
FIG. 3 is a flow diagram representing process flow for a READ command according to the invention.

In FIG. 3, the operational flow for management logic processing in response to a READ PAGE command is illustrated. Initially, the management logic 17 is in a WAIT state 50 from which it can exit to any one of at least three processes, including the UNCONDITIONAL WRITE, CONDITIONAL WRITE, or READ PAGE processes. In FIG. 3, it is assumed that a READ command having the form illustrated above has been received. This is signified by READ process step 60. In providing a READ PAGE command, the issuing computer system identifies itself (Si, that is, the ith system) the requested page (P), and the Buffer Address in the computer system to which the read page is to be delivered. The read process undertaken by the management logic 17 has three possible cases.

The first case occurs if an entry for the identified page P exists in the directory 24 and the page's EB bit is set to 0, signifying that the requested page is in the shared cache 20. These conditions are tested in decisions 61 and 62, respectively. Assuming the positive exit from both decisions, the read process sets bit corresponding to the identified ith computing system (Si) in the SV bit vector of the entry to 1 in step 63, returns the data page at the specified Buffer Address in step 64, and returns a cache hit indication in step 66.

The significance of this case is that any time a read request is issued for a page which is already in the shared cache 20, the page will be unconditionally returned to the requestor with a cache hit indication. The S bit for the requestor is set to a first state (1) in order to indicate that the copy of page P possessed by the system is current.

In the second case, it is assumed that an entry exists for the page P in the directory 24, but that the page has not yet been entered in the shared cache 20. In this case, following the read page step 60, the positive exit is taken from the decision 61 and the negative exit from the decision 62. Now, the S bit for the requesting system is set in step 67 to the first state (that is, to a "1") and a cache miss is issued. In this case, a previous READ PAGE command has been received by the management logic 17 resulting in creation of a directory entry, but the page has not yet been brought up from DASD.

In the last case, a directory entry for page P does not exist, and management logic 17 follows the negative exit from the decision 61 and executes steps 70, 71, and 72 in sequence. In this regard, in step 70, the management logic creates a directory entry for the page P (assuming available storage), initially conditions the entire SV bit vector for the created entry to a second state (preferably, "0"). Then, the EB bit is set to 1 CB is set to 0, and the S bit for the requesting system is conditioned to the first state. Last, a cache miss is issued in step 68 and the logic enters the wait state.

In this last case, system Si has lodged the first READ request for page P; any following READ request before the page is entered into the shared cache 20 will follow completion of a sequence consisting of procedure steps 60, 61, 62, 67, 68. Once the requested page has been moved up to the shared cache 20 from DASD, a READ request will follow the completion of a sequence consisting of steps 60, 61, 62, 63, 64, 66.

Figure 4:
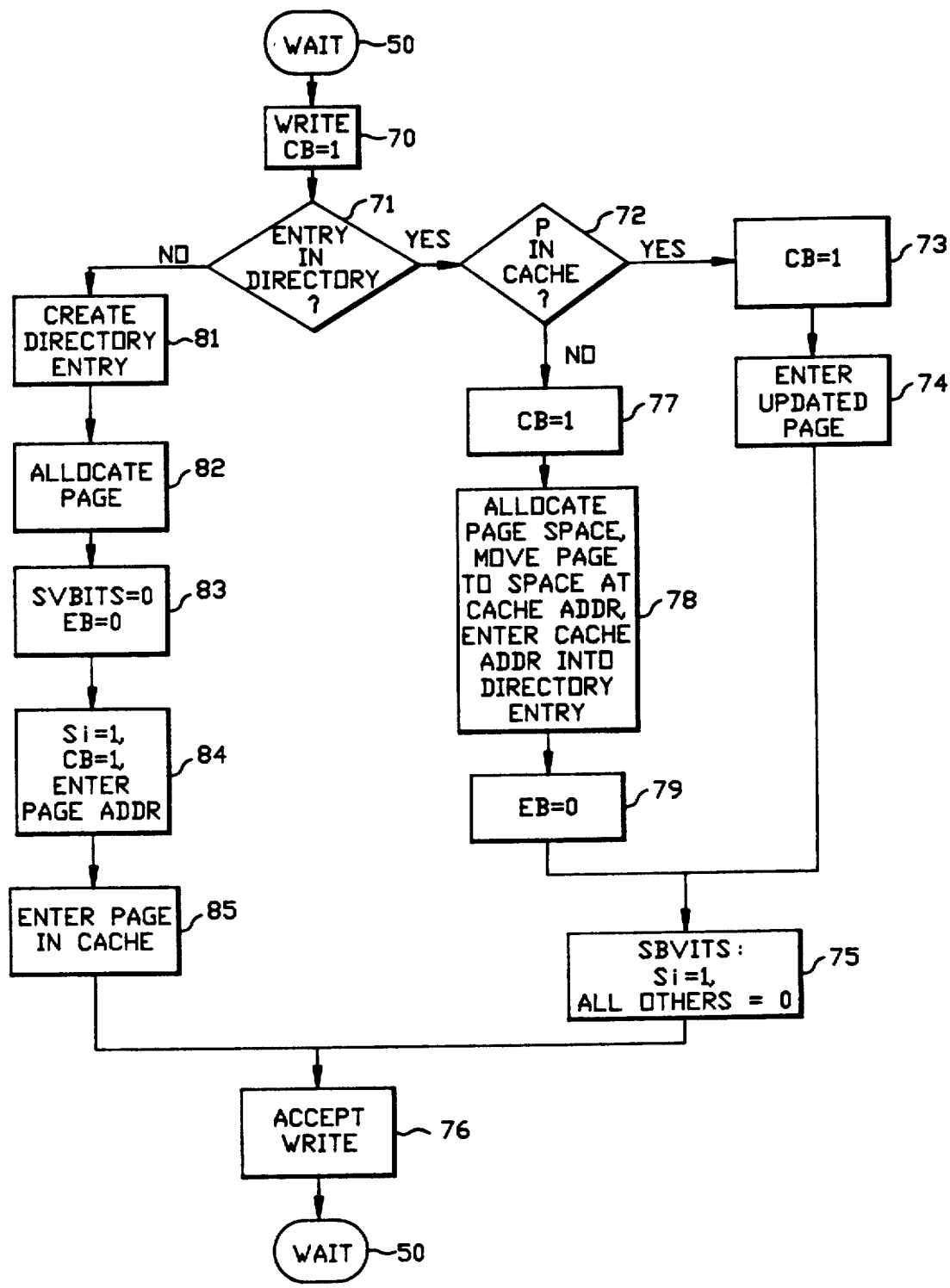
FIG. 4 is a flow diagram representing process flow for an unconditional WRITE command according to the invention.

The process employed in the management logic for writing an updated page to the shared cache 20 is illustrated in FIG. 4. A page may be updated after being retrieved from the shared cache 20 by a READ PAGE command. Alternately, a page may be updated after being obtained from a DASD, but before the page is ever entered into the shared cache 20. Assume that system Si has acquired the page P, has updated the page, and now must write the page into the shared cache 20. System Si will issue the WRITE command with CB=1 to write the updated page P. The processing undertaken by management logic in response to this WRITE command is illustrated in FIG. 4.

In FIG. 4, there are three possible cases: an entry for the page P exists in the directory 24 and EB=0 (the page is in the shared cache 20); the entry for page P exists, but the page has not yet been entered in any form into the shared cache 20 (EB=1); or, an entry does not exist for the page P in the directory.

In the first case, the write process undertaken by the management logic 17 (FIG. 4) moves through the sequence 70, 71, 72 and then executes steps 73, 74, 75 and 76. In step 73, the CB field of the directory entry for page P is set to 1. Next, in step 74, the existing version of page P is overwritten with the data at the Buffer Address provided with the WRITE command. Then, all S bits in the SV BIT VECTOR for the page's data entry are set to 0 except the S bit for the system issuing the WRITE command. Upon exiting step 75, the management logic returns an acceptance of the command to the requesting system in step 76 and then enters the wait state 50.

In the second case, where there is a directory entry for the page P, but the page is not in the shared cache, the management logic process 17 moves from the wait state 50 through steps 70 and 71, takes the negative exit from decision 72, and executes steps 77, 78, 79, 75, 76. In step 77, the change bit in the directory entry for the requested page is set to 1. In step 78, space is allocated for page P in the shared cache 20, the data is moved to the allocated space from the Buffer Address of system Si, and the cache address of the page is placed in the page address field of the page's directory entry. Next, in step 79, the empty bit is set to 0 in page P's directory entry and step 75 is executed, following which the logic returns an acceptance of the command and enters the wait state 50.

In the last case, when there is no directory entry for page P, the negative exit is taken from the decision 71 and steps 81-85 and 76 are executed, following which the logic enters the wait state 50. In step 81, a directory entry is created for page P, and in step 82, space is allocated in the shared cache for entry of the page. In steps 83 and 84, relevant bits in the directory entry are conditioned. In step 83, all bits in the page's SV bit vector are initialized to 0 and the EB bit is set to 0. Next, in step 84, the S bit for the requesting system (bit Si) is conditioned to a 1 and the change bit is also set to a 1, indicating that the page has been changed, and the page's address is placed in the entry. In step 85, the directory entry for page P is entered into the directory and the page is placed into the cache at the allocated location. The logic then returns an acceptance and enters the wait state.

It is observed that the write process of FIG. 4 is unconditional in that the request is never rejected. Further, execution of any one of the WRITE cases will result in setting the change bit for the affected page and zeroing all bits of the SV bit vector for the affected page, save the bit for the writing computer system. As will be seen from the following description of the CONDITIONAL WRITE, zeroing the S bits for non-writing computer systems during a WRITE will prevent entry of down-level pages into the shared cache. However, the WRITE does not prevent the completion of later-occurring unconditional WRITES. In order to ensure that at any time only one system is modifying a page, the inventors contemplate that a WRITE lock would be acquired by the writing system.

Figure 5:
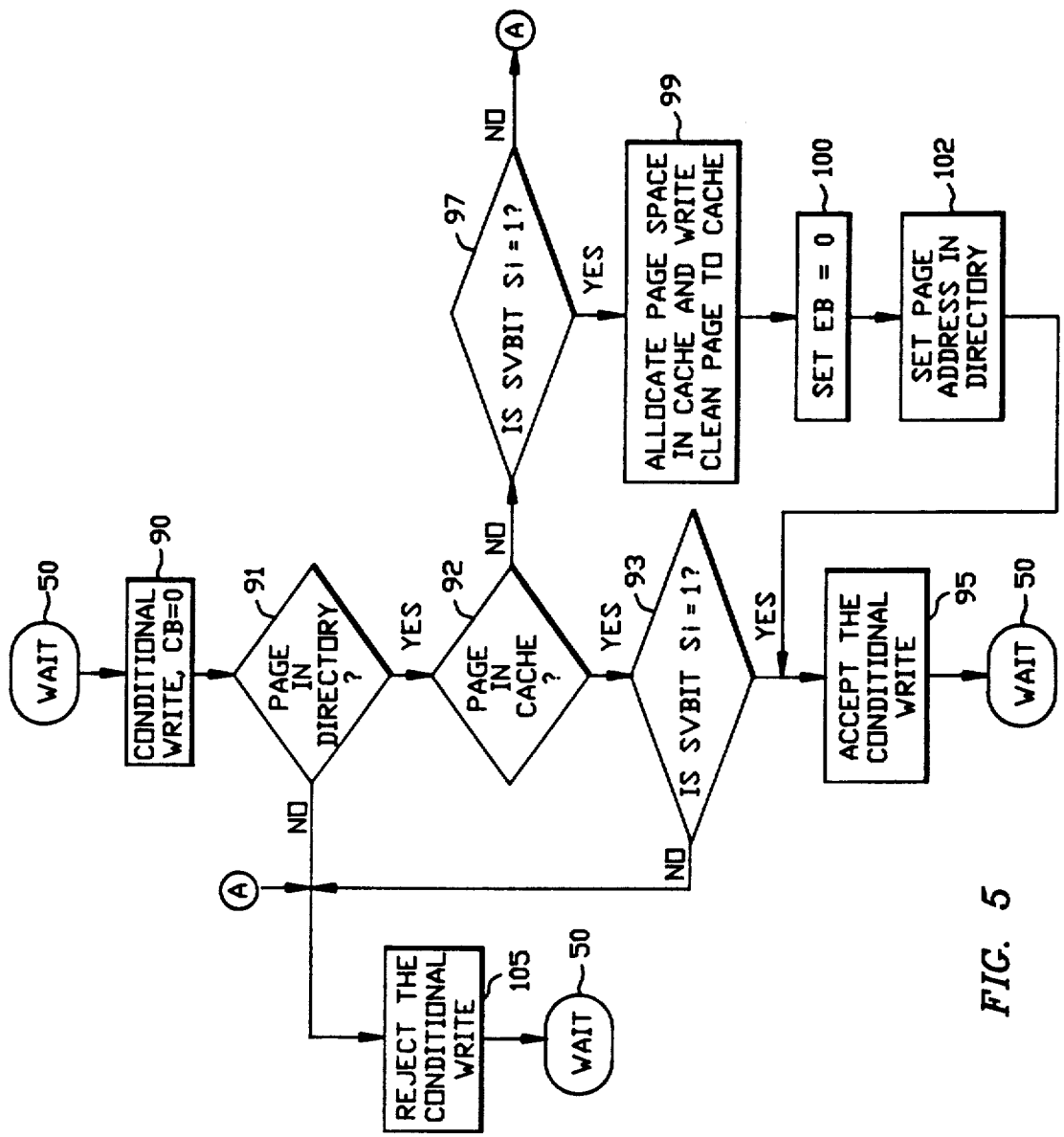
FIG. 5 is a flow diagram representing process flow for a CONDITIONAL WRITE command according to the invention.

Refer now to FIG. 5 for an understanding of the conditional write processing embodied in the management lock 17. In this processing, it is assumed that system SI received a cache miss from the NV-store and has then obtained a page from secondary storage, has not changed it, and is preparing to cache it in the shared cache 20. In the parameter set sent to the management logic 17, system Si sets the change bit to 0, which signifies that the page in the possession of the computer system is equivalent to the secondary storage version of the page. Again, there are three cases.

In the first case, system Si issues a CONDITIONAL WRITE command with CB equal to 0. The command is responded to in step 90 and the directory 24 is checked for an entry corresponding to page P. Assuming the page is in the directory, the positive exit is taken from step 91 and in step 92 the empty bit of the entry is checked to determine whether the page is in the cache. Assuming the positive exit from decision 92, the page would be in the cache. At this point, the S bit for system Si is checked in the SV bit vector of the page entry to determine whether another system has changed the page. If bit Si is set to 1, no change to the page has occurred and the positive exit is taken from decision 93. Now, the management logic 17 has determined that the page is in the cache, that the page submitted by SI is equivalent to the page in the cache, and that no overwriting of the page is required. Thus, the management logic 17 will return the appropriate code to signify acceptance of the CONDITIONAL WRITE in step 95. Note, however, that no data will be transferred from the memory of the system SI to the shared cache 20. The logic then enters the wait state.

In the second case, a directory entry exists for page P and the positive exit is taken from step 91. However, assume that in step 92 the management logic 17 determines that the page is not in the cache and takes the negative exit from decision 92, next encountering decision 97. In decision 97, bit Si of the SV bit vector for page P is checked. If the bit has been set to 1, system Si is in possession of a valid page. At this point, the positive exit is taken from the decision 97. Space is allocated in the shared cache and the clean page is moved from the Buffer Address of system Si to the allocated space in the cache (step 99). In step 100, the EB bit is set to 0. In step 102, the page address is set in the directory entry and the entry is placed in the directory. Last, the management logic returns an acceptance of the CONDITIONAL WRITE to system Si and enters the wait state.

In this case, assume that the outcome of the decision at 97 is negative. Now, system Si is not in possession of a valid page and the conditional write processing is terminated through step 105, the management logic 17 returning the rejection of the CONDITIONAL WRITE command to system Si and then entering the wait state 50.

Last, if the management logic determines in response to a received CONDITIONAL WRITE command that no entry has been made for page P in the directory 24, the negative exit is taken from decision 91, command processing is terminated and the command is rejected in step 105, the management logic then entering the wait state 50.

OPERATION OF THE INVENTION

Figure 6:
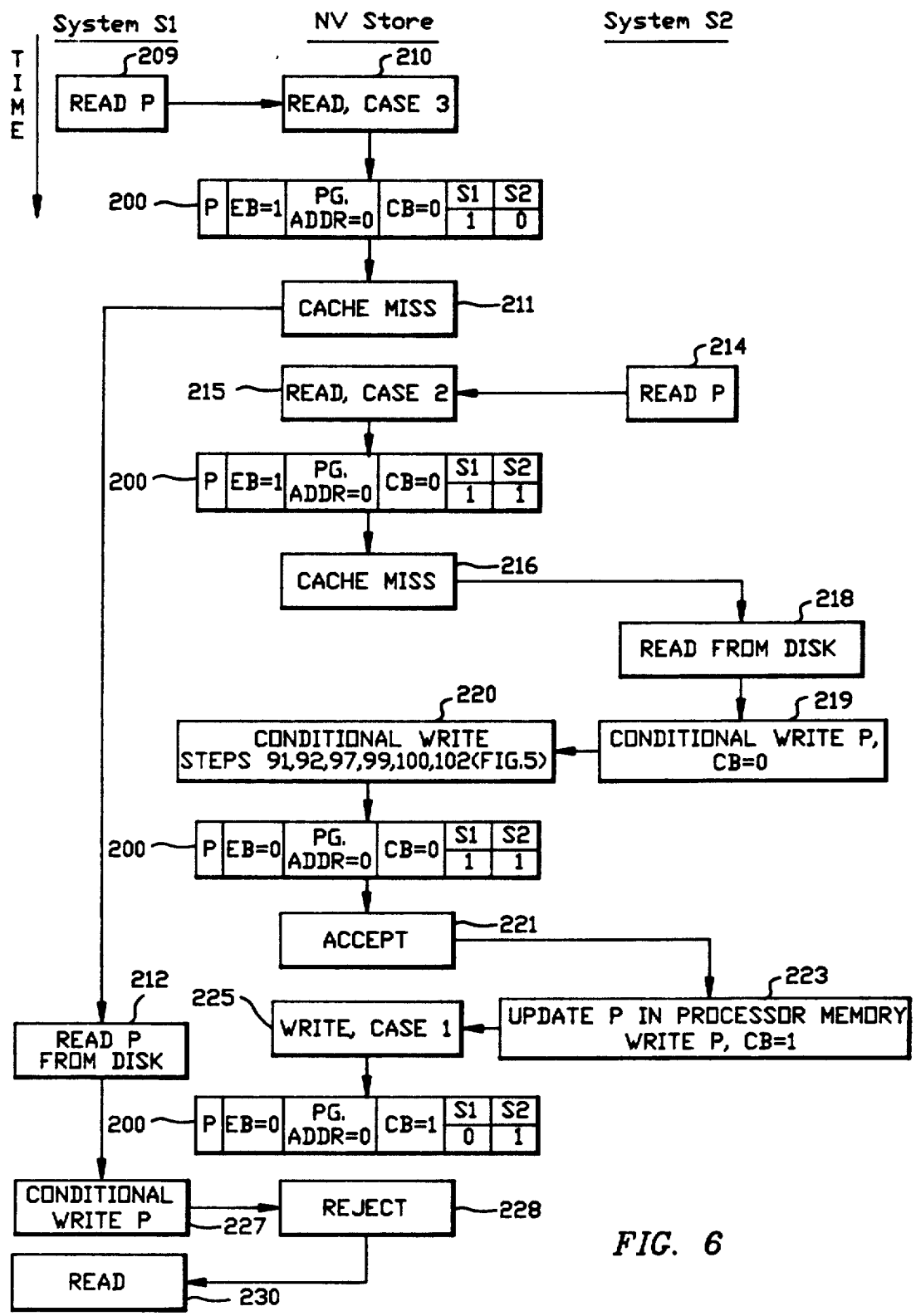
FIG. 6 is a flow diagram which illustrates a method according to the invention.

Referring now to FIG. 6, an example of the operation of the invention will be explained. Given the commands and processing described above, the example will show that the invention prevents a down-level version of any page from overlaying a more recent copy of the same page when multiple systems could be reading and updating the page with non-blocking serialization at the NV-store where the commands for a page are processed serially. The non-blocking serialization exhibits a distinct advantage over blocking serialization since the latter requires queueing of requests, resuming of requests, and requires complicated recovery mechanisms.

In the example, assume that there are two systems, S1 and S2, which are involved in data sharing. In illustrating the sequence of events in the example, use is made of a representative directory entry 200 for a page P. Assume also that the passage of time is represented by the downward-pointing arrow marked "time".

Assume first, in step 209, that system S1 issues a READ PAGE command for page P. Assume further that the NV-store does not have a directory entry for P. In this case, management logic will execute case 3 of READ processing in step 210, creating a directory entry 200 for P, initializing the entry by filling the page name field, setting the empty bit field to 1, setting the page address field to 0, setting the change bit field to 0, and appending S1 and S2 fields, with S1=1 and S2=0. At the end of case 3 read processing, the NV-store in step 211 issues a cache miss indication to system S1, in which case S1 would initiate a process for reading page P from secondary storage in step 212.

Assume, next, that S2 issues a READ PAGE command for page P in step 214. In this case, the management logic would execute read processing case 2 in step 215, setting S2=1 and returning a cache miss in action 216. At this time, system S2 initiates processing in step 218 to read page P from secondary storage.

Now assume that system S2 is the first to obtain a DASD version of page P. With this version, system S2 issues a CONDITIONAL WRITE in step 219 to the NV-store with CB=0. Having a page entry for page P but no copy of the page in the cache, and with SV bit vector bit S2=1, the management logic 17 in action 220 executes CONDITIONAL WRITE command processing steps 90, 91, 92, 97, 99, 100, and 102 entering the page into the shared cache 20, setting the EB" bit to 0, entering the page's cache address in the directory entry, and then issuing an acceptance of the CONDITIONAL WRITE in action 221.

Assume, next, that system S2 updates page P before system S1 reads it from DASD and in action 223 issues a WRITE command with CB=1. In response, management logic 17 will execute case 1 of the WRITE processing in action 225, resulting in the change of bit S1 in the SV BIT VECTOR to 0. This signifies that any copy of page P in the possession of system S1 is down-level.

Last, assume that the disk-read processing initiated by system S1 in step 212 for page P is completed. Now, system S1 will attempt to put the down-level version of page P into the NV-store by a CONDITIONAL WRITE command in step 227. The management logic 17 will traverse steps 90-93 of the CONDITIONAL WRITE processing, taking the negative exit from decision 93 and rejecting the CONDITIONAL WRITE in step 228. With rejection of the CONDITIONAL WRITE, system S1 can obtain page P from the NV-store with another READ PAGE command step 230.

The non-blocking serialization protocol for moving a page obtained from first-level storage into a shared NV-store works well because the NV-store begins tracking caching of the page (in the SV bit vector) at the first READ PAGE command issued, even if the command results in the cache miss owing to the absence of the directory entry or data. Any unconditional WRITE command by another system will set the change bit for page P and will reset the S bits of all other systems other than the writing system in the page's SV bit vector. Processing of a subsequent CONDITIONAL WRITE command will key on: a) the writing system's S bit in the SV bit vector; or, b) absence of a directory entry for the page. The NV-store rejects the CONDITIONAL WRITE command in both cases.

The reason why the CONDITIONAL WRITE command must be rejected for case (a) is because some other system will have updated the page, or the NV-store will have stolen the entry and then recreated it. In this latter case, it is conservatively assumed that the page was updated, cast out, and then re-entered.

The reason why the CONDITIONAL WRITE command must be rejected for case (b) is explained by the following scenario: system S1 issues a READ PAGE command for page P and receives a cache miss. System S1 now reads the page from secondary storage. Meanwhile, system S2 issues a READ PAGE command for page P, receives a cache miss, obtains page P from secondary storage prior to system S1. Now, system S2 issues a CONDITIONAL WRITE command to enter page P, then updates page P and issues a WRITE command with CB=1, marking the S-bit for system S1 as invalid. (This is the processing illustrated in FIG. 6.) Subsequently, system S2 removes (casts out) page P from the NV-store and writes it to secondary storage. The directory entry and shared cache allocation for page P becomes stealable and is stolen by the NV-store. Now, if the CONDITIONAL WRITE command of system S1 were to be accepted, a down-level copy of page P would be cached in the NV-store. Hence, the CONDITIONAL WRITE command must be rejected if the directory entry for the page P does not exist.

CONDITIONAL WRITE WITH CB=1

The inventors also contemplate that the CONDITIONAL WRITE command can be issued by a computer system with the change bit set to 1. In this regard, the command is still used to "cast in" to the NV-store a page obtained from secondary storage which the computer system has updated. In this case, the computer system offers the updated page to management logic 17 for entry into the cache with a CONDITIONAL WRITE command having the same parameter set as that given above, with the exception that CB=1. With this condition, global locking to serialize updates to a page can be avoided. Avoidance of such global locking is illustrated as follows:

1. System S1 issues READ PAGE for page P;
2. System S2 issues READ PAGE for page P;
3. System S2 obtains page P and updates the page in its buffer before conditionally writing it to the shared cache;
4. System S2 issues a CONDITIONAL WRITE for page P with CB=1;
5. System S1 obtains page P and updates the page in its buffer;
6. System S1 issues a CONDITIONAL WRITE for page P with CB=1;
7. The CONDITIONAL WRITE of system S1 is rejected because bit S1 in the SV bit vector for page P is set to 0, denoting that the page is "invalid" (it has a value of 0);
8. System S1 now issues a READ PAGE for page P;
9. In response to S1's READ PAGE command, the management logic sets bits S1 in the SV bit vector for page P to "valid" (a value of 1);
10. System S1 obtains a more recent version of page P from the shared cache or from secondary storage. This version would include the updates made by system S2;
11. System S1 updates page P in its buffer; and
12. System S1 issues a CONDITIONAL WRITE command with CB=1

Assuming that no other system has updated page P, system S1's CONDITIONAL WRITE command would be accepted and would include the updates of system S1 and S2. Thus, this variation of the invention contemplates that in any computer system, failure of the system to conditionally write to the shared cache 20 will be followed by a CONDITIONAL WRITE command, and so on, for so long as the system attempts to update the page. In this manner, updating is serialized by the CONDITIONAL WRITE command while global locking is avoided.

BEST MODE

The inventors contemplate that the best system mode for practicing the invention is that illustrated in FIG. 1 and described above. Presently, the invention would be practiced in the form of programming of the management logic 17 and the data base management systems of the computer systems 10, 11, and 12. Such programming is derivable from the process flow diagrams of FIGS. 3, 4, and 5, the operational flow diagram of FIG. 6, and the explanations given hereinabove. In this regard, the management logic 17 would be practiceable as a mechanism for non-blocking caching of data obtained from DASD in the shared cache 20 of FIG. 2. This is not to obviate the possibility that the management logic could be partially or entirely hard-wired with circuitry which is derivable from the explanation given above and the flow diagrams.

Manifestly, any of those reasonably skilled in the art will understand that, although the invention has been shown and described in respect of specific embodiments thereof, various changes and omissions in the form and details of the invention may be made without departing from the spirit and scope of the invention.

We claim:

1. A method for conditionally entering a block of data into a relatively high-speed memory, in a complex including management logic means for entering data in the memory in response to WRITE commands, for obtaining data from the memory in response to READ commands and for creating, managing, and deleting directory entries representing data stored in the memory, a relatively low-speed storage facility for storing data, and a plurality of computer systems connected to the memory, to the management logic means, and to the storage facility, the method comprising the steps of:

providing a READ command from a first computer system to the management logic means for reading the block of data;
   responsive to the READ command, creating a directory entry for the block of data;
   storing the directory entry for the block of data in a directory;
   reading, with a second computer system, the block of data from said storage facility;
   issuing a WRITE command from the second computer system for entering the block of data into the memory;
   responsive to the WRITE command, if the directory entry for the block of data has been deleted from the directory, preventing entry of the block of data into the memory; otherwise,
   entering the block of data into the memory.

2. A method for conditionally entering a block of data into a relatively high-speed memory, in a complex including management logic means for entering data in the memory in response to WRITE commands and for obtaining data from the memory in response to READ commands, a relatively low-speed storage facility for storing data, and a plurality of computer systems connected to the memory, to the management logic means, and to the storage facility, the method comprising the steps of:

in response to a READ command issued by a first computer system for obtaining the block of data, the READ command being issued prior to the block of data being entered into the memory, the management logic means creating and storing in a directory a directory entry representing the block of data, the directory entry including a plurality of system representations, each system representation corresponding to a respective one of the plurality of computer systems;
   responsive to the READ command, the management logic means setting the system representation for the first computer system to a first state indicating that its version of the block of data is valid; and
   if the block of data is changed to an updated version by a second computer system and entered into the memory from the second computer system, the management logic means setting the system representation for the first computer system to a second state indicating that its version of the block of data is not valid;
   reading, with the first computer system, the block of data from said storage facility;
   issuing a WRITE command from the first computer system for entering the block of data into the memory;
   responsive to the WRITE command, if the system representation for the first computer system is set to the second state, the management logic means preventing entry of the block of data from the first computer system into the memory; otherwise,
   entering the block of data from the first computer system into the memory.

3. The method of claim 2, wherein the READ command includes the following steps:

checking the directory for the directory entry representing the block of data;
   if the directory entry is in the directory, and if the block of data is in the memory setting the system representation for the first computer system to the first state and returning to the first computer system an indication that the block of data is in the memory;
   otherwise, setting the system representation for the first computer system to the first state and providing to the first computer system an indication that the block of data is not in the memory.

4. The method of claim 3, wherein the READ command further includes the steps of:

if the directory entry representing the block of data is not in the directory, storing the directory entry representing the block of data in the directory;
   initially setting all of the system representations included in the directory entry to the second state;
   setting the system representation for the first computer system to the first state; and
   providing to the first computer system an indication that the block of data is not in the memory.

5. The method of claim 2, wherein the step of entering the block of data from the first computer system into the memory includes the following steps:

if the block of data is in the memory, providing to the first computer system an indication that the WRITE command is rejected if the system representation for the first computer system is set to the second state;

otherwise, providing an indication to the first computer system that the WRITE command has been accepted.

6. The method of claim 2, wherein the step of entering the block of data from the first computer system into the memory includes the following steps:

if the directory entry representing the block of data is in the directory and the block of data is not in the memory, preventing entry of the block of data into the memory if the system representation for the first computer system is set to the second state;

otherwise, entering the block of data from the first computer system into the memory.

7. The method of claim 6, wherein:

if the directory entry representing the block of data is not in the directory, preventing entry of the block of data into the memory and providing an indication of the prevention to the first computer system.

8. A combination including a relatively high-speed memory, at least one relatively low-speed storage facility for storing data, a plurality of computer systems connected to the memory and to the storage facility, and a non-blocking management logic apparatus connected to the plurality of computer systems for serializing a caching of data in the memory, said apparatus comprising:

system-valid vector means responsive to a request to read a block of data which is not in the memory for producing and storing in the memory a system-valid vector containing a plurality of system representation fields, each system representation field representing whether or not a version of the block of data in the possession of a respective computer system is valid;

first WRITE means responsive to a request from a requesting computer system to enter an updated version of the block of data in memory for setting the system representation field for the requesting computer system to a state indicating that the requesting computer system is in possession of a valid version of the block of data and for setting all other system representation fields to indicate that non-requesting computer systems are not in possession of a valid version of the block of data; and second WRITE means responsive to a request form a requesting computer system holding a version of the block of data obtained from the storage facility to enter the version of the block of data obtained from the storage facility into the memory and responsive to the system representation fields for entering the block of data obtained from the storage facility in the memory when the system representation field for the requesting computer system holding the version of the block of data is set to indicate that that requesting computer system is in possession of a valid version of the block of data.

9. A method for entering a block of data into memory in a system including at least one relatively low-speed storage facility for storing data, a plurality of computer systems connected to the memory and to the storage facility, and management logic means coupled to the memory for entering data in the memory in response to WRITE commands, obtaining from the memory in response to read commands, and creating directory entries corresponding to data stored in the memory, the method including the steps of:

issuing a READ command from a first computer system for reading the block of data from the memory;

in response to the READ command, creating a directory entry corresponding to the block of data, which directory entry includes a first information field containing system representations for respective ones of the computer systems, each system representation being selectively set to a first state to indicate that a respective computer system possesses a valid version of the block of data and to a second state to indicate that the respective computer system does not possess a valid version of the block of data;

in response to the READ command, setting the system representation for the first computer system to the first state;

updating the block of data and writing the updated block of data to the memory with a second computer system;

in response to writing the updated block of data to the memory, changing the system representation for the first computer system to the second state;

obtaining, with the first computer system, the block of data from the low-speed storage facility and changing the block of data from the low-speed storage facility to produce a changed, updated block of data;

issuing a WRITE command from the first computer system for entering the changed, updated block of data into the memory;

in response to the second state of the system representation for the first computer system, preventing the entry of the changed, updated block of data from the first computer system into the memory;

(a) issuing a READ command from the first computer system for reading the block of data from the memory;

(b) in response to the READ command changing the system representation for the first computer system to the first state;

(c) issuing a WRITE command from the first computer system for entering the changed, updated block of data into the memory; and (d) if the system representation for the first computer system is in the first state, entering the changed, updated block of data into the memory;

otherwise, executing steps (a)–(d) until the changed, updated block of data is entered into the memory.

* * * * *

UNITED STATES PATENT AND TRADEMARK OFFICE
Certificate

Patent No. 5,276,835                                                         Patented: January 4, 1994

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Chandrasekaran Mohan, San Jose, CA; Inderpal S. Narang, Saratoga, CA; David A. Elko, Poughkeepsie, NY; Jeffrey Alan Frey, New Paltz, NY; John Franklin Isenberg Jr., Poughkeepsie, NY; Jeffrey Mark Nick, Fishkill, NY; Jimmy Paul Strickland, Saratoga, CA; and Michael Dustin Swanson, Poughkeepsie, NY.

Signed and Sealed this Thirteenth Day of July, 1999.

EDDIE P. CHAN
*Supervisory Patent Examiner*
Art Unit 2751